(12) United States Patent
Khaligh et al.

(10) Patent No.: US 8,089,254 B2
(45) Date of Patent: Jan. 3, 2012

(54) DIGITAL CONTROL OF POWER CONVERTERS

(75) Inventors: Alireza Khaligh, Chicago, IL (US); Young-Joo Lee, Chicago, IL (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 202 days.

(21) Appl. No.: 12/337,211

(22) Filed: Dec. 17, 2008

(65) Prior Publication Data

US 2010/0148739 A1 Jun. 17, 2010

(51) Int. Cl.
G05F 1/24 (2006.01)
G05F 1/00 (2006.01)

(52) U.S. Cl. ........................ 323/259; 323/283

(58) Field of Classification Search ................... 323/259, 323/283
See application file for complete search history.

(56) References Cited

U.S. PATENT DOCUMENTS

| | | | |
|---|---|---|---|
| 4,039,925 A | 8/1977 | Fletcher et al. | |
| 4,115,860 A | 9/1978 | Atwater | |
| 4,245,286 A | 1/1981 | Paulkovich et al. | |
| 4,736,151 A | 4/1988 | Dishner | |
| 5,371,666 A | 12/1994 | Miller | |
| 5,465,011 A | 11/1995 | Miller et al. | |
| 5,831,418 A * | 11/1998 | Kitagawa | 323/222 |
| 6,037,755 A | 3/2000 | Mao et al. | |
| 6,166,527 A | 12/2000 | Dwelley et al. | |
| 6,169,680 B1 | 1/2001 | Matsui et al. | |
| 6,229,288 B1 | 5/2001 | Baretich et al. | |
| 6,373,150 B1 | 4/2002 | Fuller | |
| 7,102,334 B2 | 9/2006 | Wiegand et al. | |
| 2001/0043050 A1 | 11/2001 | Fisher, Jr. | |
| 2004/0027003 A1 | 2/2004 | Yang | |
| 2004/0150928 A1 | 8/2004 | Goodfellow et al. | |
| 2004/0189271 A1 | 9/2004 | Hansson et al. | |
| 2005/0002208 A1 | 1/2005 | Kung et al. | |
| 2005/0254266 A1 * | 11/2005 | Jitaru | 363/16 |
| 2008/0082277 A1 | 4/2008 | Holmquist et al. | |
| 2008/0218104 A1 | 9/2008 | Lukic et al. | |
| 2009/0039852 A1 * | 2/2009 | Fishelov et al. | 323/283 |
| 2009/0103341 A1 | 4/2009 | Lee et al. | |

FOREIGN PATENT DOCUMENTS

| | | |
|---|---|---|
| EP | 0 207 096 | 7/1986 |
| EP | 1 166 430 A1 | 1/2002 |
| EP | 1 324 476 A1 | 7/2003 |
| EP | 1 513 239 A1 | 3/2005 |

OTHER PUBLICATIONS

A. Chakraborty, Digital Combination of DC/DC Converter: A Novel Theory Applied to Positive Buck-Boost Converters, May 2007, Illinois Institute of Technology, 1-170.*

(Continued)

*Primary Examiner* — Jue Zhang
(74) *Attorney, Agent, or Firm* — Pauley Petersen & Erickson

(57) ABSTRACT

A method of controlling a DC/DC converter to regulate an output voltage from an input voltage source that varies from a fully-charged voltage to a discharged voltage. The method introduced improves the dynamic response of the converter during transients by switching between different converter topologies to spread out voltage spikes, which are an inevitable result of transients. The invention also can improve the efficiency of the DC/DC converter by replacing higher loss modes with combination modes.

12 Claims, 18 Drawing Sheets

OTHER PUBLICATIONS

Chakraborty et al., Digital Combitation of buck and Boost Modes to Control a Positive Buck-Boost Converter, IEEE, Jun. 2006, PESC '06 37th IEEE, 2372-2377, 1-6.*

Y. Lee et al., "Digital Combination of Buck and Boost Converters to Control a Positive Buck-Boost Converter and Improve the Output Transients," submitted to IEEE Transactions on Power Electronics on May 28, 2008, 34 pages.

A. Chakraborty et al., "Digital Combination of Buck and Boost Converters to Control a Positive Buck-Boost Converter," Proc. IEEE Power Electronics Specialists Conference, Jun. 2006, vol. 1, pp. 1-6.

A. Chakraborty et al., "Combination of Buck and Boost Modes to Minimize Transients in the Output of a Positive Buck-Boost Converter," Proc. IEEE 32nd Industrial Electronics Annual Conference, Paris, France, Nov. 2006, pp. 2372-2377.

Y. Konishi et al., "Soft-Switching Buck Boost Converter using Passive Snubber composed of Pulse Current Regenerative Resonant Circuit," Elect. Ltrs., Jan. 2007, vol. 43, pp. 886-890.

L. Yang et al., "Analysis and Design of a Novel Three-Phase AC-DC Buck-Boost Converter," IEEE Transactions on Power Electronics, Mar. 2008, vol. 23, pp. 707-714.

B. Sahu et al., "A Low Voltage, Dynamic, Noninverting, Synchronous Buck-Boost Converter for Portable Applications," IEEE Transactions on Power Elect., Mar. 2004, vol. 19, No. 2, pp. 443-452.

B. Bryant et al., "Derivation of the buck-boost PWM DC-DC Converter Circuit Topology," Proc. International Symposium on Circuits and Systems, May 2002, vol. 5, pp. 841-844.

Y.Zhang et al., "A New Soft Switching Technique for Buck, Boost and Buck-Boost Converters," IEEE Transactions on Industry Applications, Nov. 2003, vol. 39, No. 6, pp. 2343-2350.

J. Chen et al., "Buck-Boost PWM Converters Having Two Independently Controlled Switches," Proc. IEEE 32nd Power Elect. Specialists Conf., Jun. 2001, vol. 2, pp. 736-741.

D. Adar et al., "A Unified Behavioral Average Model of Sepic Converters with Coupled Inductors," Proc. IEEE Power Elect. Specialists Conference, Jun. 1997, vol. 1, pp. 441-446.

W.M. Moussa, "Modeling and Performance Evaluation of a DC/DC Sepic Converter," Proc. IEEE Applied Power Electronics Conference, Mar. 1995, vol. 2, pp. 702-706.

X. Ren et al., "Four Switch Buck-Boost Converter for Telecom DC-DC Power Supply Applications," Proc. IEEE 23rd Applied Power Elect. Confr. and Expo, Feb. 2008, pp. 1527-1530.

R.S. Weissbach et al., "A Noninverting Buck-Boost Converter with Reduced Components using a Microcontroller," Proc. IEEE Southeast Conference, Apr. 2001, vol. 2, pp. 79-84.

M. Gaboriault et al., "A High Efficiency, Non-Inverting, Buck-Boost DC-DC Converter," Proc. IEEE Applied Power Electronics Conference, Sep. 2004, vol. 3, pp. 1411-1415.

A. Syed et al., "Digital PWM Controller with Feed-Forward Compensation," Proc. IEEE Applied Power Electronics Conference and Expo, Sep. 2004, vol. 1, pp. 60-66.

V.D. Yurkevich, "Design of Controller for Buck-Boost Converter," Proc. Science and Technology, Jun. 2005, pp. 741-745.

Z. Shameem, "Discrete Circuit Protects Li-Ion Battery Charger," Proc. Power Electronics Technology Magazine, Mar. 2007, pp. 50-51.

A. Rahimi et al., "Sub-Harmonic Problem in Multi-Converter Vehicular Power Systems," Proc. IEEE Vehicular Power and Propulsion Conference, Windsor, U.K., Sep. 2006, 5 pages.

Co-pending U.S. Appl. No. 12/337,129, filed Dec. 17, 2008.

US 5,780,998, 07/1998, Scott et al. (withdrawn)

* cited by examiner

DIGITAL CONTROL OF POWER CONVERTERS

BACKGROUND OF THE INVENTION

1. Field of the Invention

This invention relates generally to a method of digitally controlling power converters and particularly to a control strategy for reducing output voltage spikes during transients by incorporating intermediate combination modes in place of direct transitions from one mode to another mode. This invention also can improve the efficiency of power converters by replacing higher loss modes with combination modes.

2. Discussion of Related Art

A common power handling problem, especially for portable applications powered by batteries, such as cellular phones, PDAs, digital cameras, wireless modems and DSL modems, is a need to provide a regulated non-inverting output voltage from a variable input voltage source.

Voltage sources, such as batteries, that power these devices generally vary from a fully-charged voltage to a discharged voltage. Often the device will have a voltage requirement that is between the fully-charged voltage and the discharged voltage. Thus the voltage source must be regulated, e.g., stepped-up or stepped-down as required, to provide an output voltage that meets the voltage requirement of the device.

Regulation of variable voltage sources from one voltage level to another voltage level is generally accomplished by means of a DC-DC power converter. Known power converter topologies that can provide a constant voltage output from a variable voltage input include: Single-Ended Primary Inductance Converters (SEPIC); Ćuk converters; isolated buck-boost converters; and cascaded buck and boost converters.

Known methods of controlling these power converter topologies include bucking (i.e., stepping-down the voltage level) the input voltage when it is greater than the voltage requirement of the device, boosting (i.e., stepping-up the voltage level) the input voltage when it is less than the voltage requirement and buck-boosting when the input voltage is nearly equal to the voltage requirement. Each of these changes, from buck to buck-boost, and from buck-boost to boost, are referred to as transients. Each of these transients will inevitably cause a voltage spike/voltage ripple of the output voltage. Voltage spikes can cause the converter to lose efficiency and can damage electrical devices.

FIG. 1 is a representative graph illustrating voltage versus time for an exemplary device with a variable input voltage source, a battery, and a regulated voltage output requirement. As shown, the battery has an input voltage ($V_{in}$) that varies from a fully-charged voltage of 6 V ($V_{inH}$) to a discharged voltage of 3.6 V ($V_{inL}$). This application needs to provide a steady output voltage of 5V ($V_{out}$). Using a positive buck-boost converter with a prior art control technique, the positive buck-boost converter operates in a buck mode for a timeframe '$T_A$', followed by operation in a buck-boost mode for a timeframe '$T_B$', and finally operation in a boost mode for a timeframe '$T_C$'.

Each transition from one mode to another mode results in a sudden change in a duty cycle ratio, as well as a change in the switching of switching devices. In the buck mode, when the input voltage ($V_{in}$) is nearly equal to the output voltage ($V_{out}$), a buck duty cycle, $$D_{buck} = \frac{V_{out}}{V_{in}},$$

will approach 1. In the boost mode, when the input voltage ($V_{in}$) approaches the output voltage ($V_{out}$), a boost duty cycle, $$D_{boost} = 1 - \frac{V_{in}}{V_{out}},$$

moves toward zero. In the buck-boost mode, when the input voltage ($V_{in}$) equal to the output voltage ($V_{out}$) a buck-boost duty cycle, $$D_{buck-boost} = \frac{V_{out}}{V_{in} + V_{out}},$$

becomes 0.5. As the fully-charged voltage ($V_{inH}$) decreases towards the discharged voltage ($V_{inL}$), the duty cycle should follow the pattern of 1 for the buck mode to 0.5 for the buck-boost mode and then to 0 in the boost mode. Output voltage spikes are associated with these sudden changes in the duty cycle.

SUMMARY OF THE INVENTION

A general object of the invention is to provide a method of controlling a DC-DC converter to provide a desired output voltage from an input voltage that varies from a voltage greater than the desired output voltage to less than the desired output voltage and while reducing voltage spikes/voltage ripple during transients.

The general object of the invention can be attained, at least in part, through a control strategy based on digital control of power converters. The control strategy improves a dynamic response of converters during transients by switching between different converter topologies to spread out voltage spikes.

A controller can be used to control the converter. The controller is in electrical connection with the converter to provide a drive signal and a switching frequency to the converter. In one embodiment of this invention, the controller is a pulse width modulation (PWM) controller. Those skilled in the art will appreciate that while a PWM controller may provide the drive signal, the use of other control circuits are also within the broad scope of this invention. In one embodiment of this invention, the controller includes a pulse circuit, which may be a monostable multivibrator. The monostable multivibrator, also commonly known as a "one-shot," is triggered, in one embodiment, by a rising edge of the drive signal to generate a pulse of fixed duration. Alternatively, the monostable vibrator may be triggered by a trailing edge of the drive signal.

The control strategy of this invention desirably operates the converter in a first converting mode, such as a buck mode, when the voltage of the battery is in a range from fully-charged to a first predetermined voltage level. The first converting mode comprises a first duty cycle pulse which is repeated for each period of the switching frequency.

When the voltage of the battery is less than a second predetermined voltage level, the controller operates the converter in a second converting mode, such as a boost mode. The second converting mode comprises a second duty cycle pulse which is repeated for each period of the switching frequency.

When the voltage of the battery is in a range between the first predetermined voltage level and the second predetermined voltage level, the controller operates the converter in a third converting mode. The third converting mode switches between the first converting mode and the second converting mode to spread out voltage spikes which occur during transients. The third converting mode is a combination configuration of the first duty cycle pulse and the second duty cycle pulse. The third converting mode replaces the prior art method of instantaneous transition from the first converting mode to the second converting mode.

In one embodiment of the third converting mode, for a plurality of switching cycles the converter operates with the first duty cycle pulse and for at least one switching cycle the converter operates with the second duty cycle pulse. Operation in the third converting mode can be repeated for a plurality of times or until the voltage of the battery is equal to or less than the second predetermined voltage level.

In another embodiment, the third converting mode is a sequential pattern of switching cycles according to the first converting mode and a sequential pattern of switching cycles according to the second converting mode. Specifically, the sequential pattern starts with a plurality of switching cycles with the first duty cycle pulse and at least one switching cycle with the second duty cycle pulse. Then, the controller decreases the number of switching cycles with the first duty cycle pulse and increases the number of switching cycles with the second duty cycle pulse. This pattern repeats until the controller decreases the number of switching cycles with the first duty cycle pulse to zero. For example, if the third converting mode is starts with five switching cycles with the first duty cycle pulse and one switching cycle with the second duty cycle pulse and each sequence decreases the number of switching cycles with the first duty cycle pulse by one and increases the number of switching cycles with the second duty cycle pulse by one. Then the sequential pattern of switching cycles is: five with the first duty cycle pulse and one with the second duty cycle pulse; then four with the first duty cycle pulse and two with the second duty cycle pulse; then three with the first duty cycle pulse and three with the second duty cycle pulse; then two with the first duty cycle pulse and four with the second duty cycle pulse; and then one with the first duty cycle pulse and five with the second duty cycle pulse.

Alternatively, when the voltage of the battery is in a range between the first predetermined voltage level and the second predetermined voltage level, the controller operates the converter in the third converting mode (a first combination mode), then in a fifth converting mode (such as a buck-boost mode) and then in a fourth converting mode (a second combination mode). In the third converting mode, for a plurality of switching cycles the converter operates according to the first converting mode and for at least one switching cycle the converter operates according to the second converting mode. The controller will then operate the converter according to the fifth converting mode for at least one switching cycle. Then in the fourth converting mode, the controller operates the converter for a plurality of switching cycles according to the second converting mode and for at least one switching cycle the converter operates according to the first converting mode. Operation in the third converting mode, the fifth converting mode and the fourth converting mode can each repeat a plurality of times before switching to the next converting mode.

Alternatively, the fifth converting mode can be eliminated and the third converting mode can transition to the fourth converting mode.

BRIEF DESCRIPTION OF THE DRAWINGS

These and other objects and features of this invention will be better understood from the following detailed description taken in conjunction with the drawings, wherein.

DESCRIPTION OF PRESENTLY PREFERRED EMBODIMENTS

This invention provides a method of controlling a converter to provide an output voltage from a variable input voltage. The invention reduces output voltage spikes during transitions from one mode to another mode by incorporating intermediate combination modes in place of direct transitions from one mode to another mode.

Figure 1:
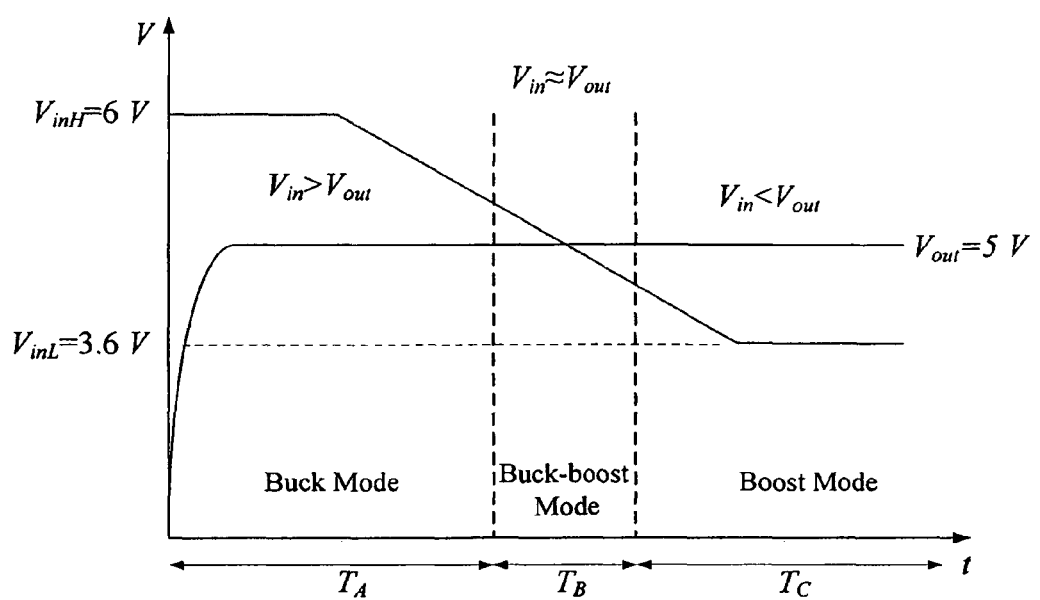
FIG. 1 is a representative graph of voltage versus time for a device with a variable input voltage source illustrating a prior art method of controlling a DC-DC converter.
Figure 2:
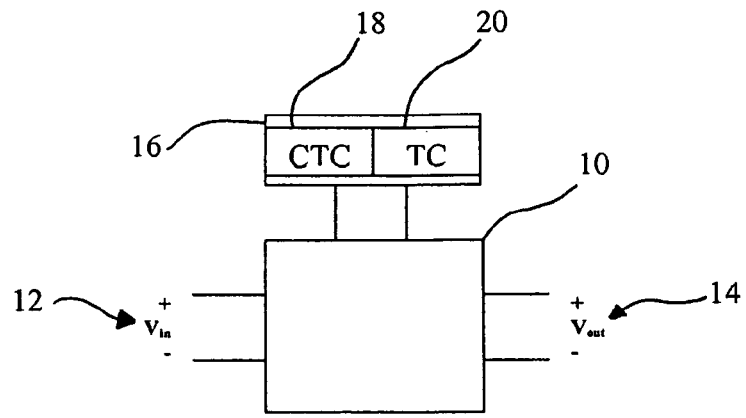
FIG. 2 is a schematic diagram of a DC-DC converter and a controller according to one embodiment of this invention.

As shown in FIG. 2, converter 10 is provided with input voltage 12 and provides output voltage 14. Input voltage 12 is a variable voltage source, such as a battery, that has a fully-charged voltage that drains to a drained voltage. Converter 10 functions to regulate input voltage 12 to a desired output voltage 14. Converter 10 can be any type of converter including, but not limited to a positive buck-boost converter, an inverting buck-boost converter, a cascaded buck and boost converter, a Ćuk converter, a SEPIC converter or a fly-back converter. Ideally, converter 10 should have the capability of operating in various converter topologies through controlled switching of components of the circuit.

Referring to FIG. 2, converter 10 is electrically connected to controller 16. Controller 16 implements a control strategy of this invention. Controller 16 includes a converter topology control (CTC) 18 and at least one transition control (TC) unit 20. The CTC 18 controls operating topologies of the converter 10. The TC unit 20 controls transitions between various topologies. The controller 16 provides a drive signal and a switching frequency to the converter 10.

In one embodiment of this invention, controller 16 comprises a pulse width modulation (PWM) controller. Those skilled in the art should appreciate that other control circuits are also within the broad scope of this invention.

In one embodiment of this invention, controller 16 includes a pulse circuit, which can be a monostable multivibrator. The monostable multivibrator, also commonly known as a "one-shot," is triggered, in one embodiment, by a rising edge of the drive signal to generate a pulse of fixed duration. Alternatively, the monostable vibrator may be triggered by a trailing edge of the drive signal.

Figure 3:
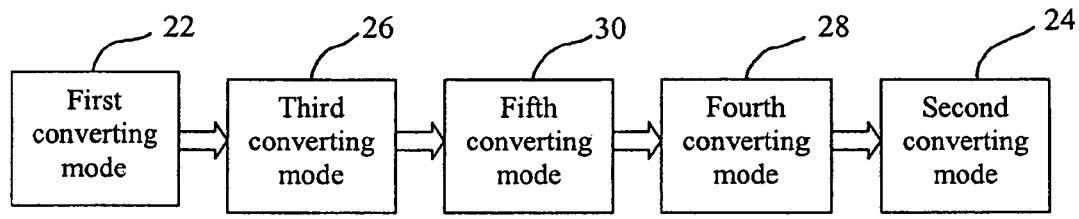
FIG. 3 shows a block diagram of a control approach of one embodiment of this invention.

FIG. 3 shows a block diagram of one embodiment of the control strategy of this invention. The control strategy includes implementing first converting mode 22, second converting mode 24, third converting mode 26, fourth converting mode 28 and fifth converting mode 30. In an alternative embodiment, the control strategy can comprise any number or combination of converting modes according to this invention.

Figure 4:
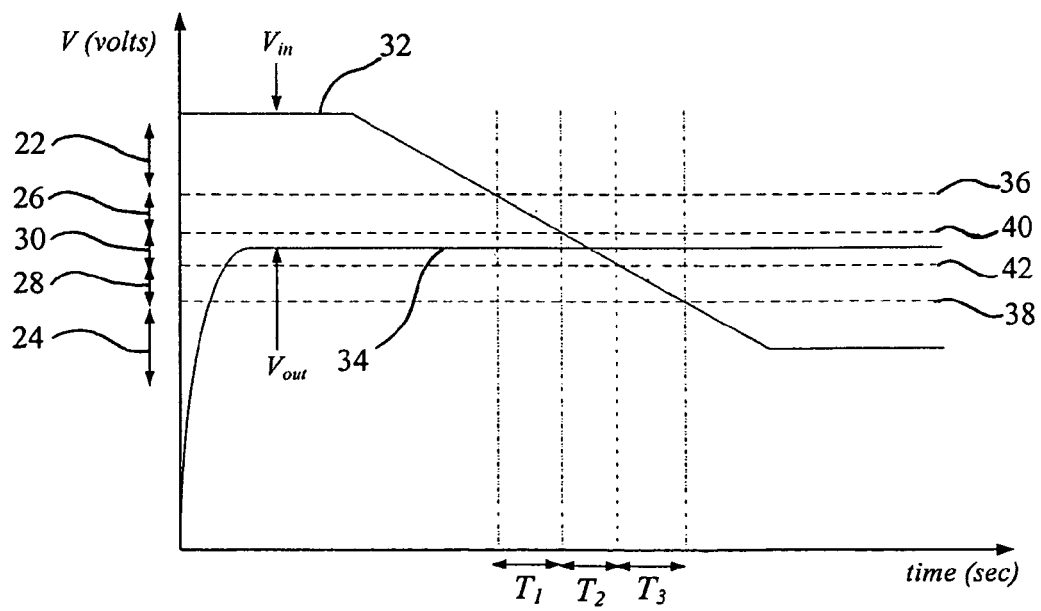
FIG. 4 is a graph of voltage versus time for a device with a variable input voltage source illustrating the control approach of FIG. 3.

FIG. 4 is a graph of voltage versus time illustrating the control strategy of FIG. 3 for a device with a variable input voltage 32 and a regulated output voltage 34. As shown in FIG. 4, when input voltage 32 is higher than first predetermined voltage level 36, converter 10 operates in first converting mode 22. First converting mode 22 repeats a first duty cycle pulse for each period. When input voltage 32 is less than second predetermined voltage level 38, converter 10 operates in second converting mode 24. Second converting mode 24 repeats a second duty cycle pulse for each period.

When input voltage 32 has a value that is between first predetermined voltage level 36 and second predetermined voltage level 38 the converter operates in one or more combination modes. In FIG. 4, two combination modes are shown, third converting mode 26 and fourth converting mode 28. Third converting mode 26 operates between first predetermined voltage level 36 and third predetermined voltage level 40. Fourth converting mode 28 operates between fourth predetermined voltage level 42 and second predetermined voltage level 38. Additionally, in FIG. 4, fifth converting mode 30 operates between third predetermined voltage level 40 and fourth predetermined voltage level 42.

Converter 10 operates in third converting mode when input voltage 32 is equal to or less than first predetermined voltage level 36 and greater than third predetermined voltage level 40. Third converting mode 26 comprises a combination configuration of the first duty cycle pulse for $\alpha_i$ periods and the second duty pulse for $\beta_i$ periods, where $\alpha_i$ and $\beta_i$ are positive integers. In one embodiment, the combination configuration is repeated until input voltage 32 equals third predetermined voltage level 40. Alternatively, the combination configuration can repeat a predetermined number of times ($\gamma_i$) and then controller 16 changes the operation of converter 10 to another converting mode.

As input voltage 32 drains to equal to or less than third predetermined voltage level 40 and greater than fourth predetermined voltage level 42, controller 16 operates converter 10 in fifth converting mode 30. In this embodiment, fifth converting mode 30 is not a combination mode, as it does not include a combination of the first duty cycle pulse and the second duty cycle pulse. Fifth converting mode 30 comprises a third duty cycle pulse which is different from the first duty cycle pulse and the second duty cycle pulse. Fifth converting mode 30 can be a buck-boost mode.

After input voltage 32 drains to equal to or less than fourth predetermined voltage level 42 and greater than second predetermined voltage level 38, controller 16 operates converter 10 in fourth converting mode 28. Fourth converting mode 28 comprises a second combination configuration of the second duty pulse for $\beta_n$ periods and the first duty cycle pulse for $\alpha_n$ periods, where $\alpha_n$ and $\beta_n$ are positive integers. In one embodiment, the second combination configuration repeats until input voltage 12 equals second predetermined voltage level 38. Alternatively, the second combination configuration can repeat a predetermined number of times ($\gamma_n$) and then controller 16 changes the operation of converter 10 to another converting mode.

In an alternative embodiment, the control strategy includes first converting mode 22, second converting mode 24, third converting mode 26 and fourth converting mode 28. In this embodiment, fifth converting mode 30 can be eliminated because implementing fifth converting mode 30 often leads to an undesirable higher loss that decreases the efficiency of converter 10.

Figure 5:
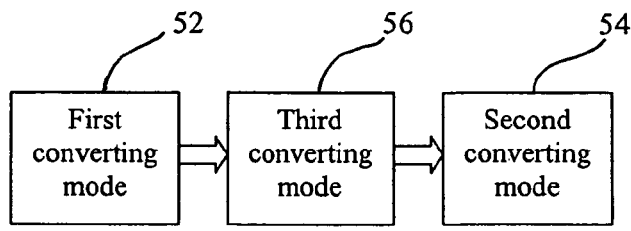
FIG. 5 shows a block diagram of a control approach of one embodiment of this invention.

FIG. 5 shows an alternative control strategy of this invention, including three modes. The control strategy of FIG. 5 includes first converting mode 52, second converting mode 54 and third converting mode 56.

Figure 6:
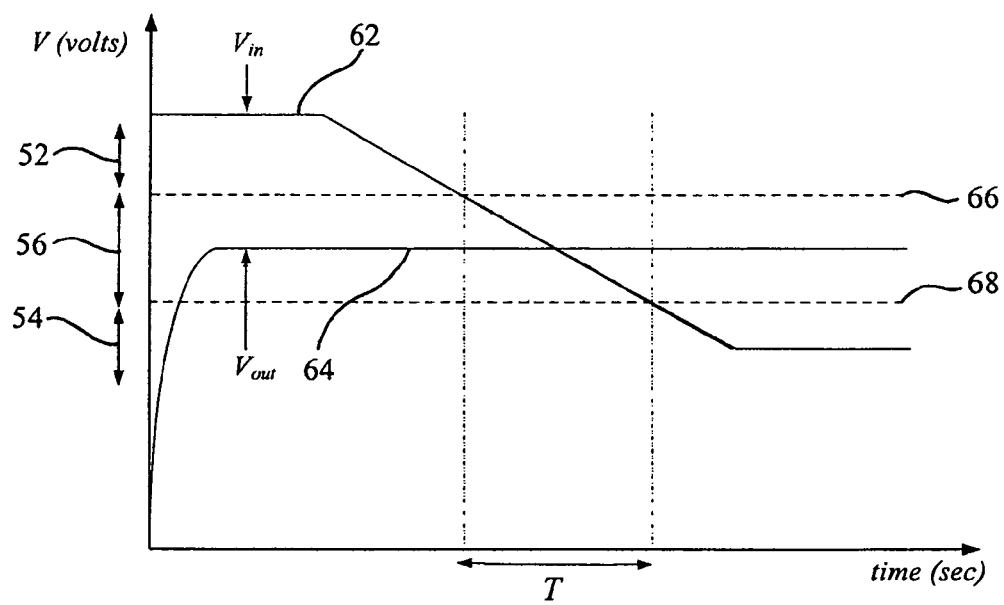
FIG. 6 is a graph of voltage versus time for a device with a variable input voltage source illustrating the control approach of FIG. 5.

FIG. 6 is a graph of voltage versus time for a device with a variable input voltage 62 and a regulated output voltage 64 and illustrating the control strategy of FIG. 5. As shown in FIG. 6, when input voltage 62 is higher than first predetermined voltage level 66, converter 10 operates in first converting mode 52. First converting mode 52 repeats the first duty cycle pulse for each period. Also when input voltage 62 is less than second predetermined voltage level 68, converter 10 operates in second converting mode 54. Second converting mode 54 repeats the second duty cycle pulse for each period.

Third converting mode 56 comes into operation when input voltage 62 is equal to or less than first predetermined voltage level 66 and greater than second predetermined voltage level 68. Third converting mode 56 comprises a plurality of sequential combination configurations of the first duty cycle pulse and the second duty cycle pulse. In one embodiment, a first sequential combination comprises a plurality of the first duty cycle pulse (α first duty cycle pulses) followed by at least one second duty cycle pulse (β second duty cycle pulses). A second sequential combination comprises a lesser amount (x) than the plurality of the first duty cycle pulse (α−x) and an increased amount of the second duty cycle pulse (β+x). The sequential combination configuration can continue until only a set number of the first duty cycle pulses, generally one, remain. For example, if the first sequential combination comprises six first duty cycles and one second duty cycle and each subsequent sequential combination is changed by one, the pattern would be: 6,1; 5,2; 4,3; 3,4; 2,5; 1,6. Alternatives include changing each sequential combination by two or another integer less than α. Another alternative includes repeating a subset a plurality of times (γ) before moving to a next subset, for example, if γ=3, then: 6,1; 6,1; 6,1; 5,2; 5,2; 5,2; 4,3, and so on.

Figure 7:
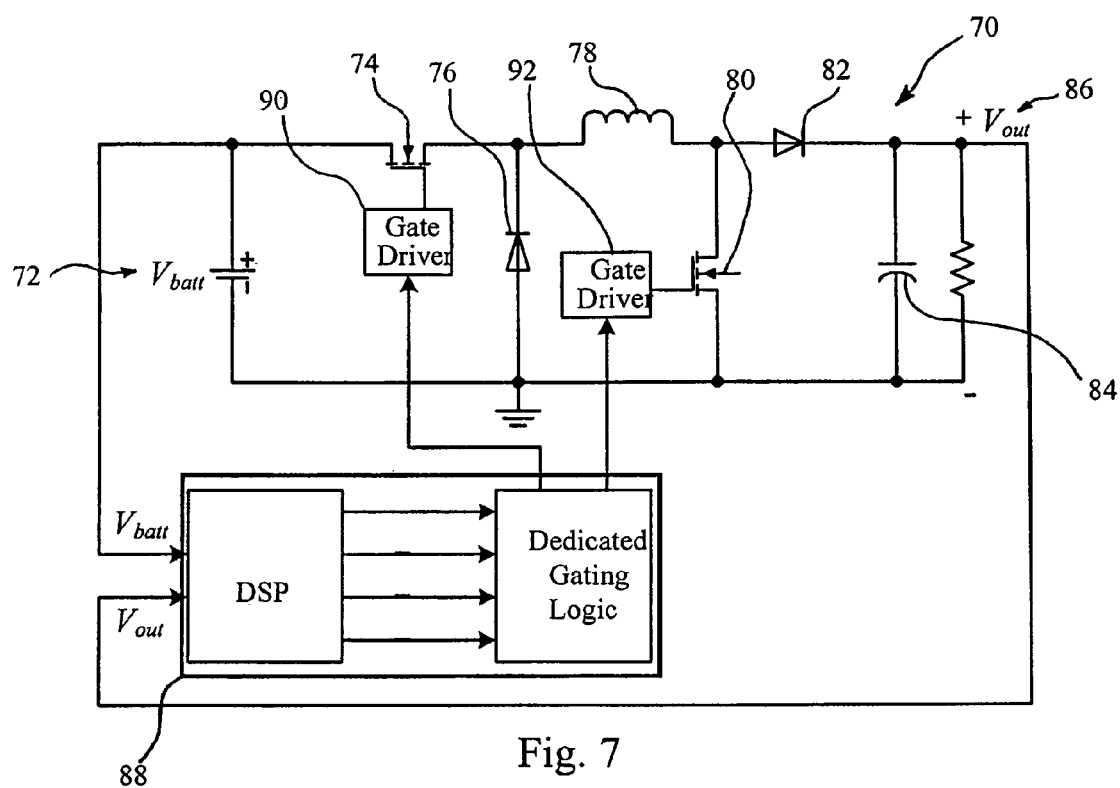
FIG. 7 shows a schematic diagram of a positive buck-boost DC-DC converter and a controller according to one embodiment of this invention.

These methods of controlling a converter can be applied to a positive buck-boost converter. In FIG. 7, positive buck-boost converter 70 comprises input voltage 72, first switching device 74, first diode 76, inductive device 78, second switching device 80, second diode 82, capacitor 84 and output voltage 86. Positive buck-boost converter 70 is connected to controller 88, first gate driver 90 and second gate driver 92.

When applying the control strategy of FIGS. 3-4 to positive buck-boost converter 70, first converting mode 22 can be a buck mode, second converting mode 24 can be a boost mode and fifth converting mode 30 can be a buck-boost mode. While third converting mode 26 and fourth converting mode 28 are combination modes.

Positive buck-boost converter 70 can operate in the buck-boost mode by switching on, i.e., conducting, first switching device 74 and second switching device 80 for the buck-boost duty cycle and then off, i.e., not conducting, for the remainder of a period. Converter 70 can operate in the buck mode by keeping second switching device 80 off and switching first switching device 74 on for a buck duty cycle and off for the remainder of the period. Converter 70 can operate in the boost mode by keeping first switching device 74 on and switching second switching device 80 on for a boost duty cycle and off for the remainder of the period.

To operate positive buck-boost converter 70 in third converting mode 26, the number of first duty cycle pulses ($\alpha_i$) and the number of second duty cycle pulses ($\beta_i$) must be determined. An analytical approach can be used to calculate the $\alpha_i$ first duty cycle pulses and the $\beta_i$ second duty cycle pulses, where the first duty cycle pulses are buck pulses and the second duty cycle pulses are boost pulses. In third converting mode 26, combining $\alpha_i$ buck pulses and $\beta_i$ boost pulses, the output voltage variation can be expressed as:

$$\frac{\partial}{\partial t} v_{out}\bigg|_{Comb.A} = \frac{1}{C(\alpha_1 + \beta_1)} \left( \alpha_1 \left( \hat{i}_{L,buck} - \frac{1}{R} v_{out} \right) + \beta_1 \left( (1 - d_{boost}) \hat{i}_{L,boost} - \frac{1}{R} v_{out} \right) \right), \quad (4)$$

where $\hat{i}_{L,buck} = \frac{v_{in} - v_{out}}{2L} d_{buck} T + I_{0,buck}$, $\hat{i}_{L,boost} = \frac{v_{in}}{2L} d_{boost} T + I_{0,boost}$, and $I_{0,buck}$ and $I_{0,boost}$ represent initial currents of inductor 78 in the buck mode and the boost mode, respectively. Equation (4) can be represented as:

$$\frac{\partial}{\partial t} v_{out}\bigg|_{Comb.A} = \frac{1}{C(\alpha_1 + \beta_1)} \left( \alpha_1 \left( \frac{v_{in} - v_{out}}{2L} d_{buck} T + I_{0,buck} - \frac{1}{R} v_{out} \right) + \beta_1 \left( (1 - d_{boost}) \frac{v_{in}}{2L} d_{boost} T + I_{0,boost} - \frac{1}{R} v_{out} \right) \right). \quad (5)$$

Since the desired output voltage variation, i.e. voltage ripple/voltage spike, is minimum or zero, $$\frac{\partial}{\partial t} v_{out}\bigg|_{Comb.A}$$

can be set to zero to solve for $\alpha_1/\beta_1$:

$$\frac{\alpha_1}{\beta_1} = \frac{-(1 - d_{boost})^2 \frac{v_{out}}{2L} d_{boost} T - I_{0,boost} + \frac{1}{R} v_{out}}{(1 - d_{buck}) \frac{v_{out}}{2L} T + I_{0,buck} - \frac{1}{R} v_{out}}. \quad (6)$$

Similarly, for fourth converting mode 28, the ratio of boost and buck pulses can be defined in terms of circuit parameters. Alternatively, a trial and error approach can be used to determine the α first duty cycle pulse and the β second duty cycle pulse in third converting mode 26 and/or fourth converting mode 28.

FIGS. 8-12, are graphs of simulation results for four methods of controlling positive buck-boost converter 70, two prior art methods and two methods according to this invention. FIGS. 13-18 are graphs of experimental results, which confirm the simulations. All simulations and experimental results are based the parameters provided in Table 1.

TABLE 1

| Variable | Parameter | Value |
| --- | --- | --- |
| L | inductance | 100 μH |
| C | Output filter capacitance | 330 μF |
| $V_{in}$ | Input voltage | 3.6 V-6 V |
| $V_{ref}$ | Output voltage | 5 V |
| f | Switching frequency | 100 kHz |
| R | Output resistance | 20 Ω |

Figure 8:
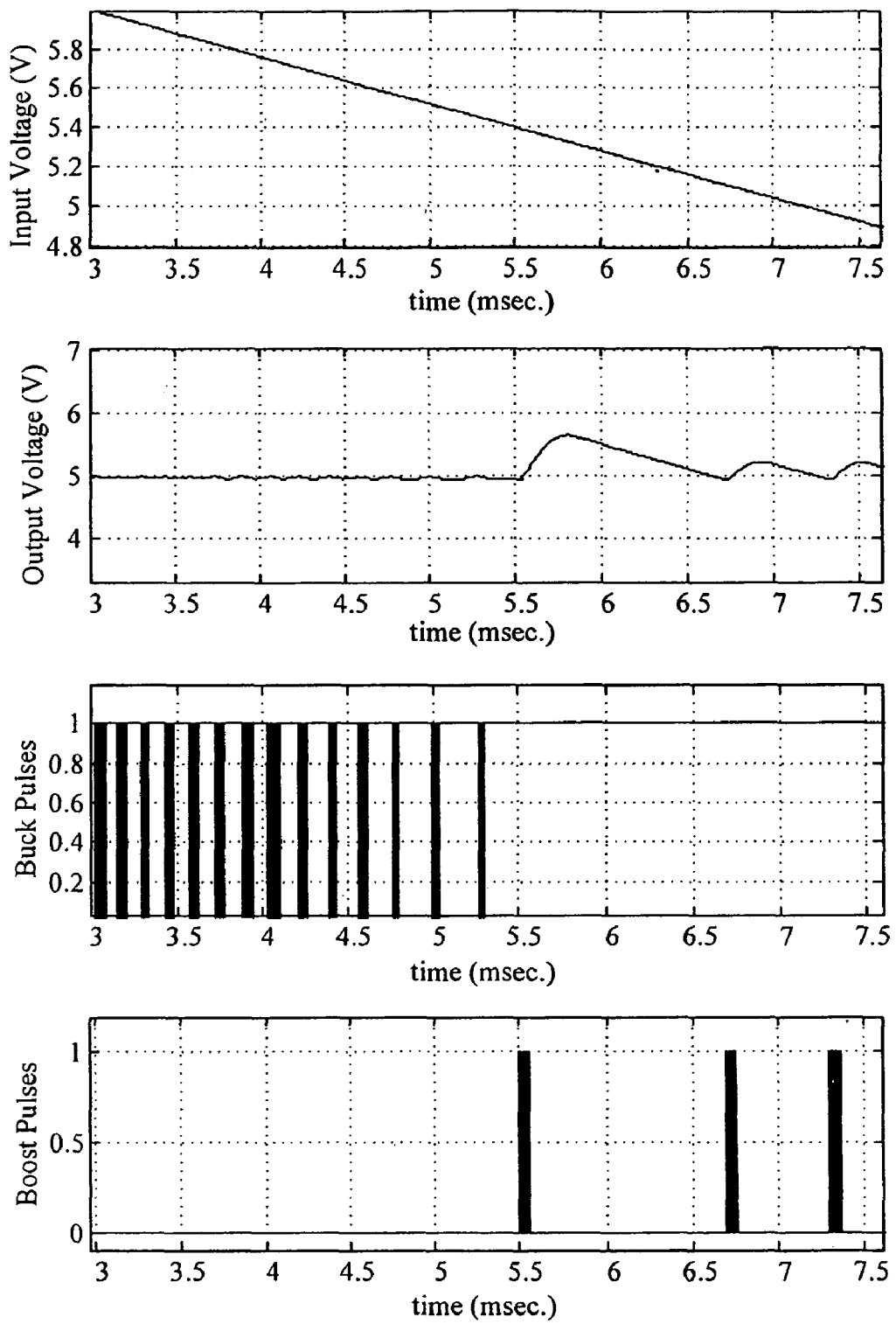
FIG. 8 presents an input voltage waveform, an output voltage waveform, buck pulses and boost pulses for a simulation of a direct transition from buck mode to boost mode according to a known method of controlling.

Simulation Results of the Prior Art, Direct Transition Method:

FIG. 8 presents an input voltage waveform, an output voltage waveform, buck pulses and boost pulses for a direct transition from buck mode to boost mode. The simulation results indicate the presence of a 12% to 14% voltage spike in the output voltage during direct transition from buck mode to boost mode.

Figure 9:
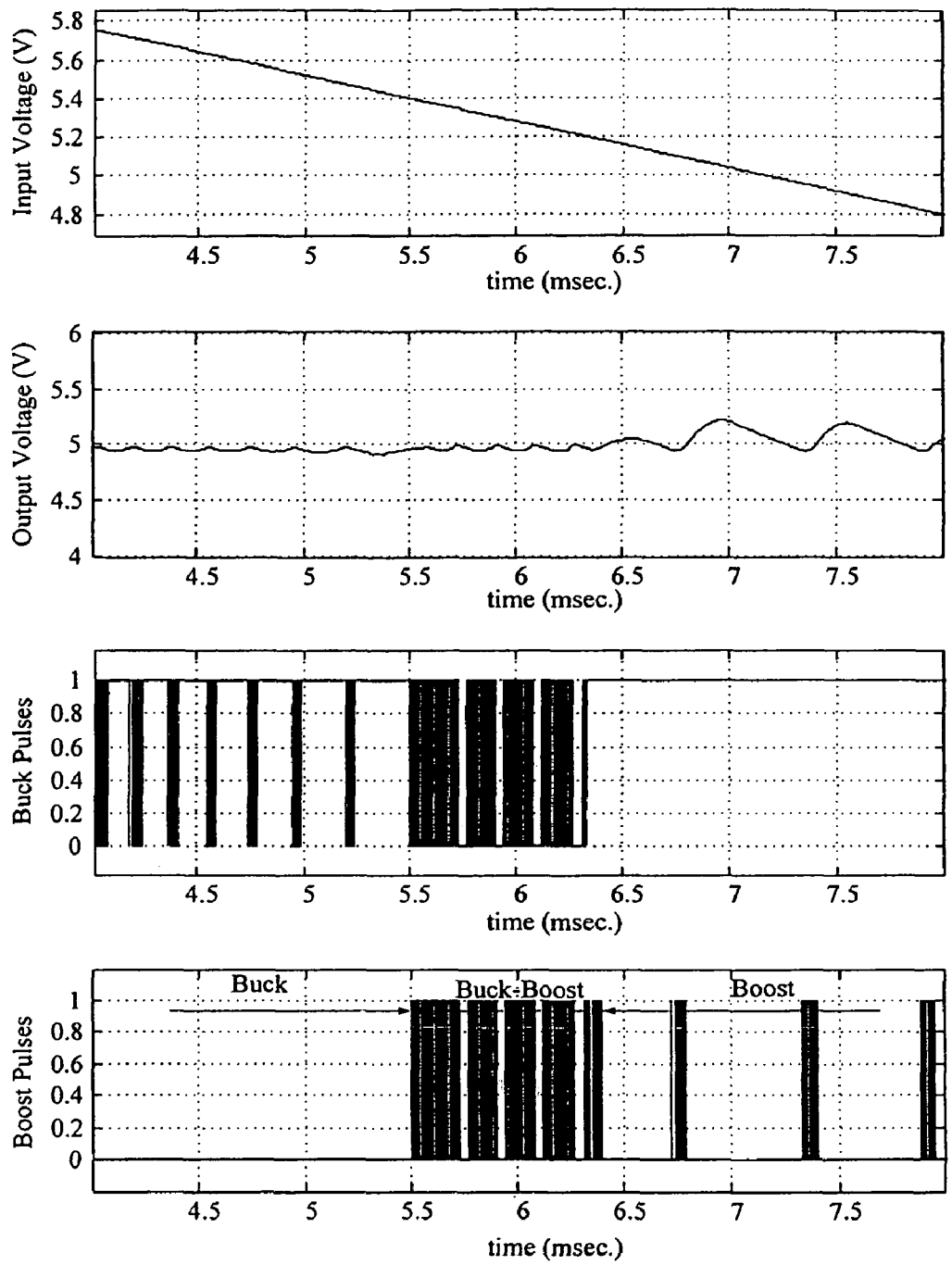
FIG. 9 presents an input voltage waveform, an output voltage waveform, buck pulses and boost pulses of a simulation of a transition from buck mode to buck-boost mode to boost mode according to a known method of controlling.

FIG. 9 presents an output voltage waveform, an input voltage, and buck and boost pulses for a transition from buck mode to buck-boost mode to boost mode. In this method, the converter initially works in buck mode, when the input voltage is greater than the output voltage, followed by buck-boost mode when the voltages are almost equal. Finally the converter works in boost mode when the input voltage is lower than the output voltage. The simulation results indicate about a 6% voltage spike in the output voltage during transitions.

Simulation Results of Two Embodiments of This Invention:

In these simulations, the first combination mode and the second combination mode comprise an embodiment of this invention with a repeating (not sequential) combination of buck and boost pulses.

Using Equation (6), just before $v_{in} \approx v_{out}$, to calculate $\alpha_1/\beta_1$ for the first combination mode provides a ratio of 3:1. Just after $v_{in} \approx v_{out}$, calculating $\alpha_2/\beta_2$ for the second combination mode provides a ratio of 1:2. Thus, the simulation uses three buck pulses and one boost pulse for the first combination mode and one buck pulse and two boost pulses for the second combination mode.

In FIGS. 10-12 and 17-19, the references to Comb. A or Comb. mode
A refer to the first combination mode, while the references to Comb. B or Comb. mode B refer to the second combination mode.

Figure 10:
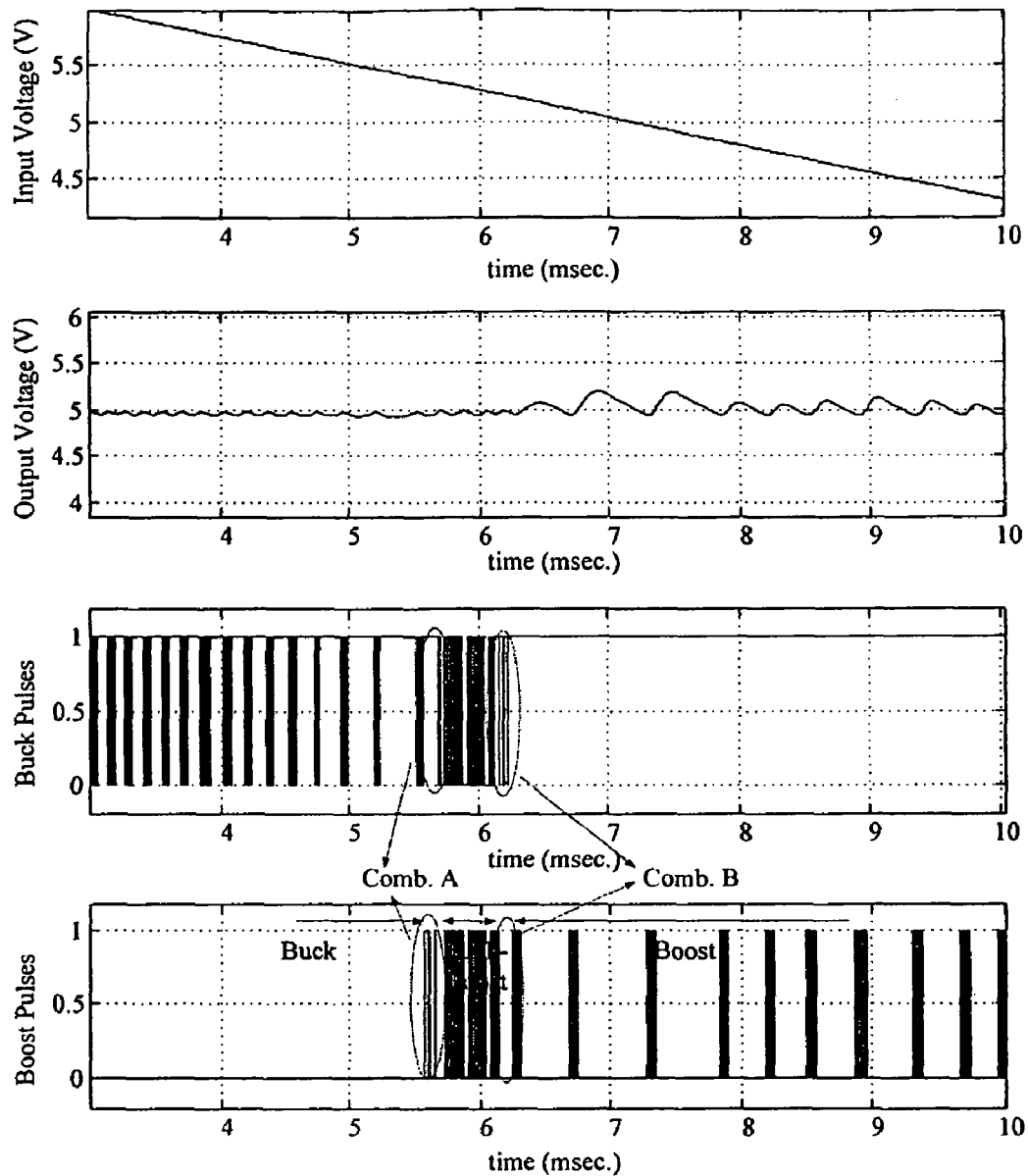
FIG. 10 presents an input voltage waveform, an output voltage waveform, buck pulses and boost pulses of a simulation of transitions from buck mode to first combination mode to buck-boost mode to second combination mode to boost mode according to one embodiment of this invention.

I) The Method of the Invention with Buck-Boost Mode:

FIG. 10 presents an output voltage waveform, an input voltage waveform, buck pulses and boost pulses for transitions from buck mode to the first combination mode to buck-boost mode to the second combination mode to boost mode. The simulation results indicate about a 4% voltage spike in the output voltage during transitions through the different modes. This method thus improves the ripple in the output voltage of the converter during transients.

Figure 11:
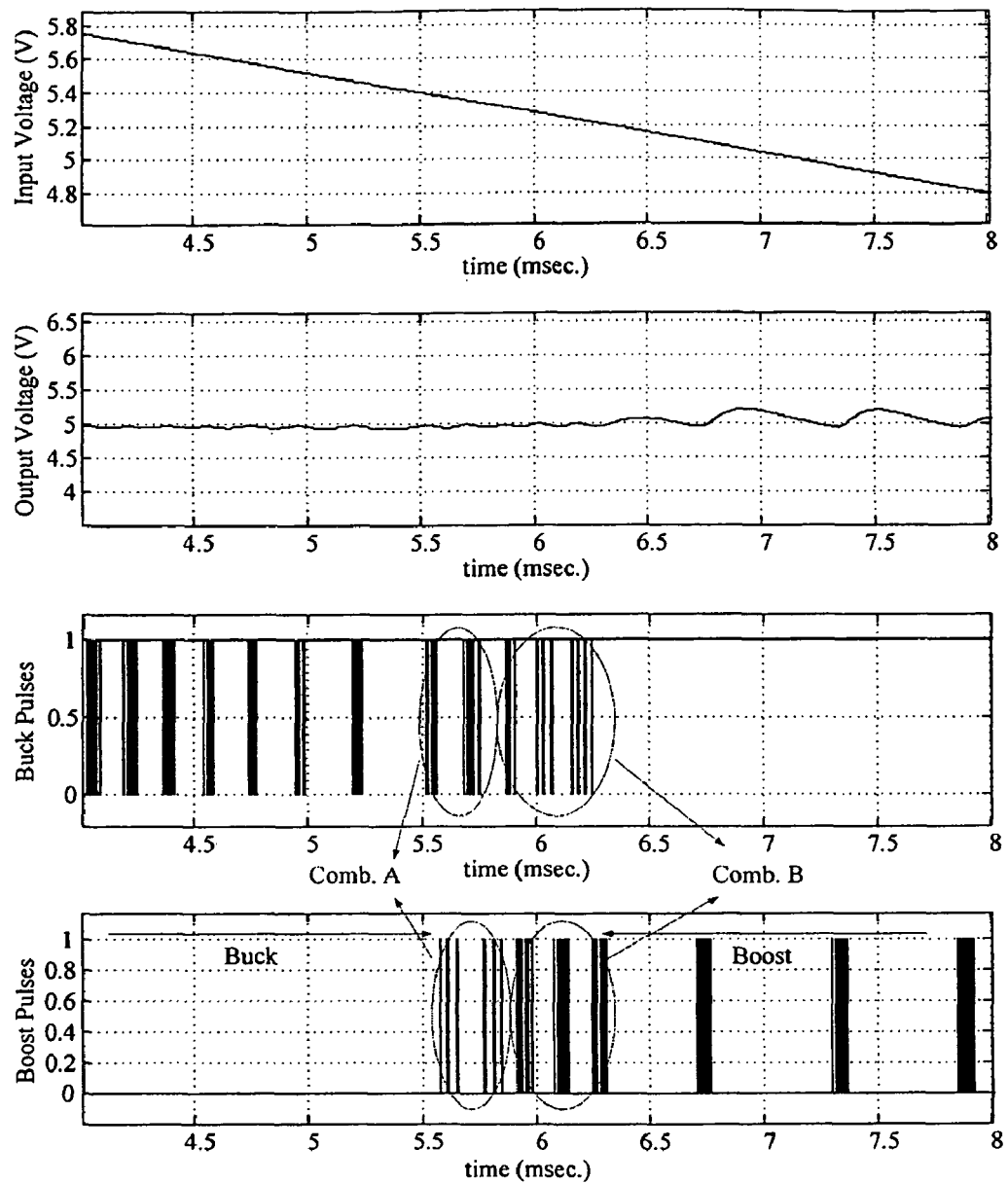
FIG. 11 presents an input voltage waveform, an output voltage waveform, buck pulses and boost pulses of a simulation of transitions from buck mode to first combination mode to buck-boost mode to second combination mode to boost mode according to one embodiment of this invention.

II) The Method of the Invention without Buck-Boost Mode:

FIG. 11 presents an output voltage waveform, an input voltage waveform, buck pulses and boost pulses for transitions from buck mode to the first combination mode to the second combination mode to boost mode. The simulation results indicate about a 4% voltage spike in the output voltage during transitions through the different modes. This result is roughly the same as the method with the buck-boost mode in the middle (FIG. 10). However, operating the converter in the buck-boost mode decreases the efficiency of the converter, eliminating the buck-boost mode significantly improves the efficiency of the converter.

Figure 12:
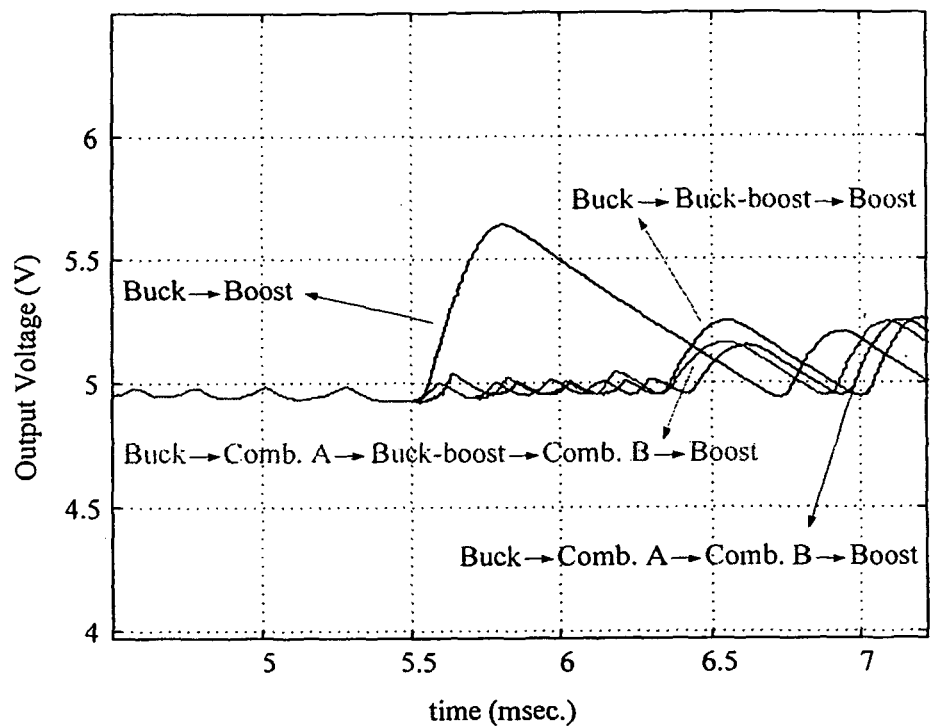
FIG. 12 presents the output voltage waveforms from the simulations of FIGS. 8-11.

FIG. 12 presents the output voltages from the simulations of all four transition methods for comparison.

Positive buck-boost converter 70 was tested experimentally to verify the simulation results. The experimental test was conducted with the following elements. First switching device 74 and second switching device 80 were N-type MOSFET switches, model number IRF540. First diode 76 and second diode 82 were Schottky barrier diodes, model number 1N5817. Controller 88 included a Texas Instrument Digital Signal Processor (DSP), model number 320F2812. Two high-side gate drivers 90, 92 and dedicated gating logic configure converter 70 into buck mode, buck-boost mode and boost mode. High-side gate drivers 90, 92 were dependent on mode selection signals from the DSP.

Figure 13A:
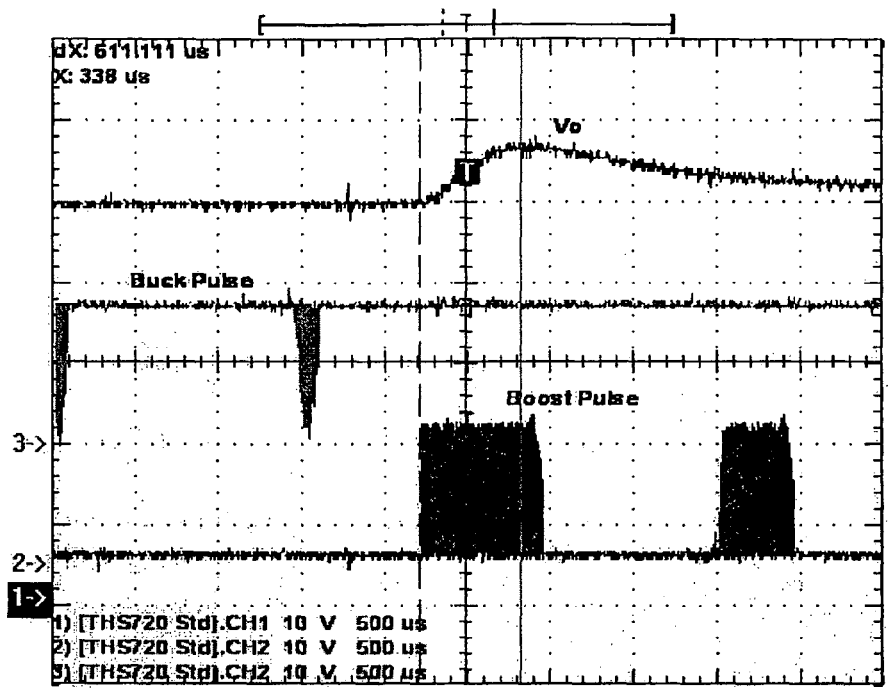
FIGS. 13*a-b* show experimental results of an output voltage, buck pulses and boost pulses in a direct transition from buck mode to boost mode.
Figure 13B:
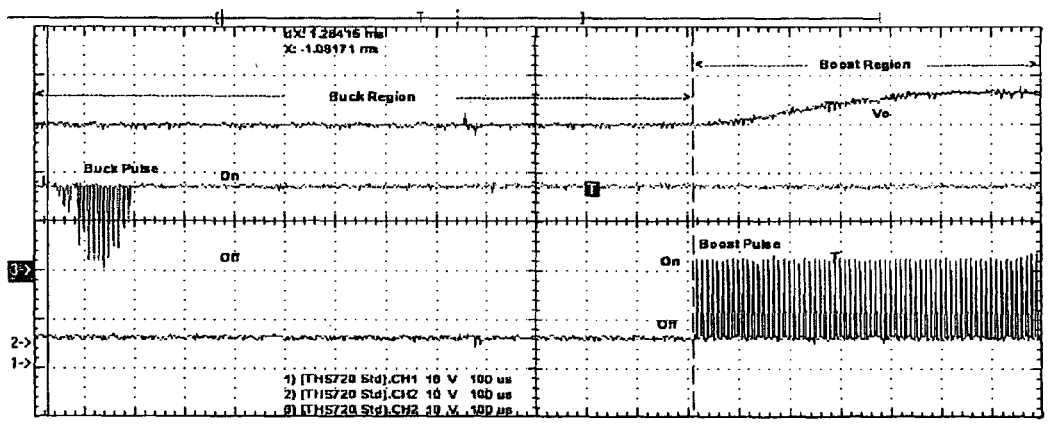
Figure 14A:
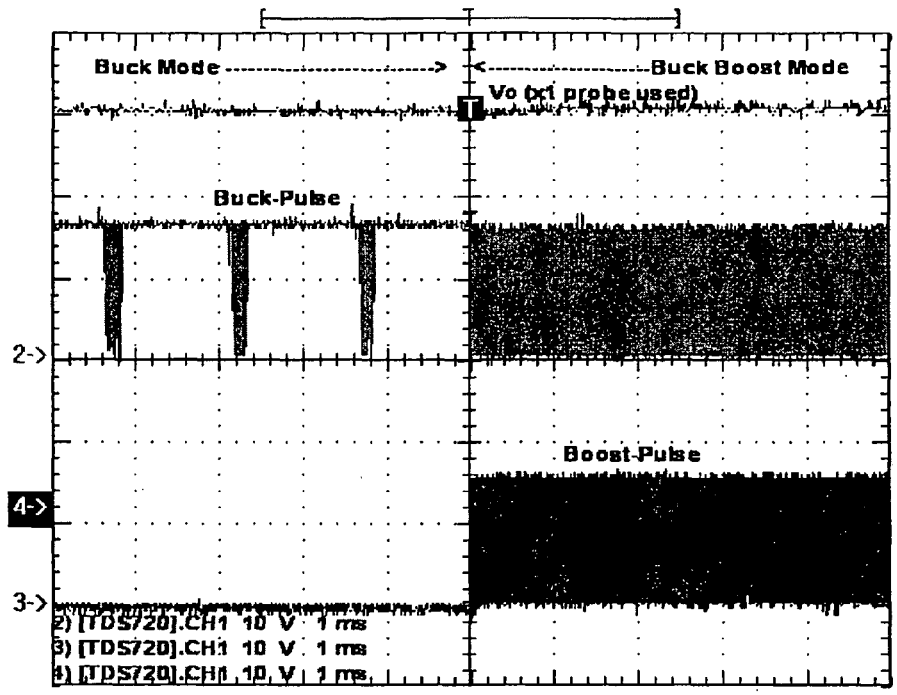
FIGS. 14*a-b* show experimental results of an output voltage, buck pulses and boost pulses in direct transition from buck mode to buck-boost mode.
Figure 14B:
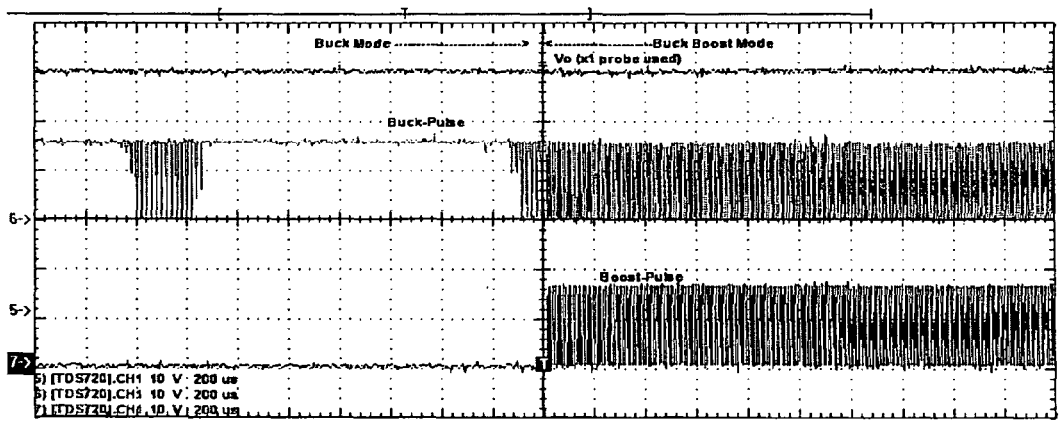
Figure 15A:
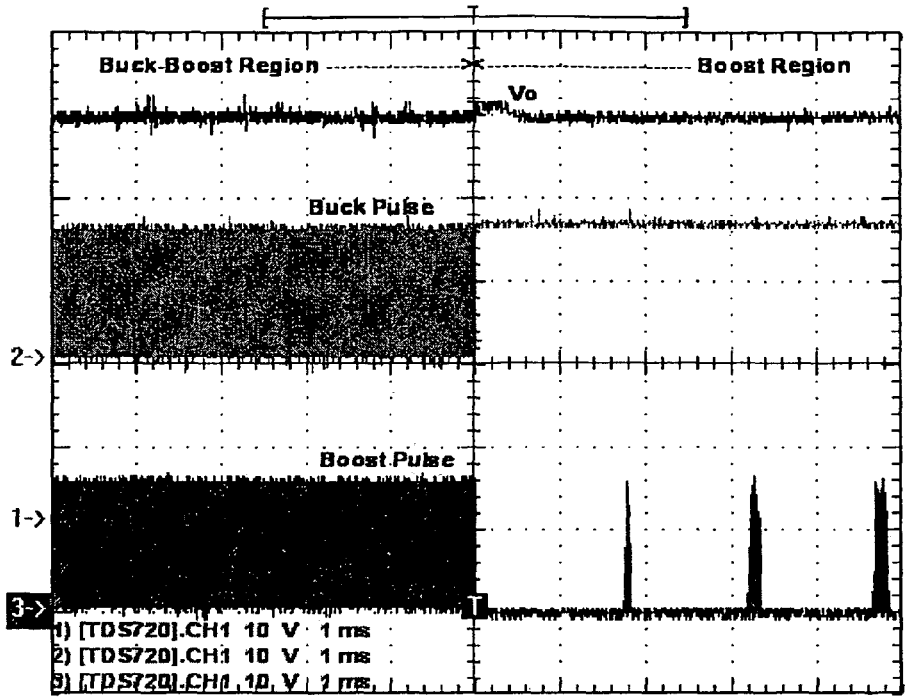
FIGS. 15*a-b* show experimental results of an output voltage, buck pulses and boost pulses in direct transition from buck-boost mode to boost mode.
Figure 15B:
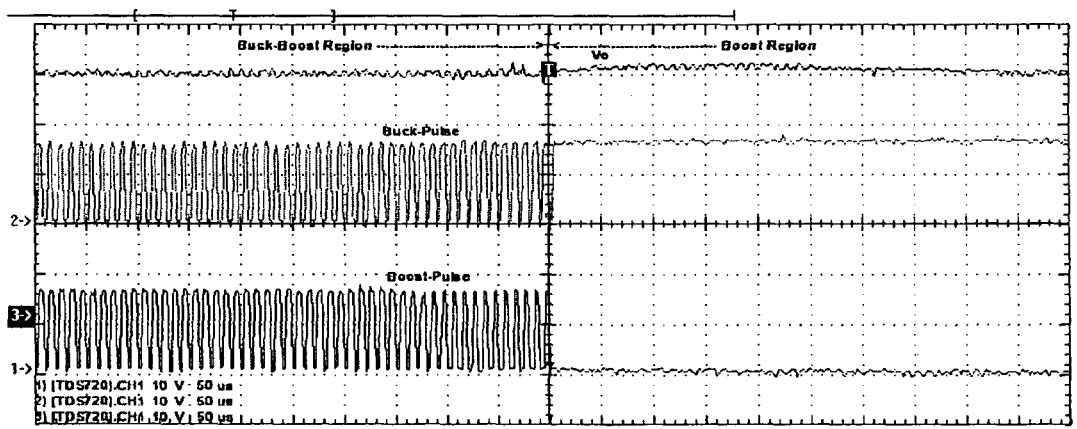

Experimental Results of the Prior Art, Direct Transition Method:

FIG. 13a shows the experimental results of the waveforms for output voltage, buck mode pulses and boost mode pulses in direct transition from buck mode to boost mode. FIG. 13b shows a closer view of the waveforms. FIGS. 13a-b show a voltage spike in the output voltage during the transition from buck mode to boost mode.

FIGS. 14a-b and 15a-b show the experimental results of the waveforms for output voltage, buck mode pulses, boost mode pulses, and buck-boost mode pulses for a direct transition from buck to buck-boost mode and from buck-boost mode to boost mode, also with closer views of the waveforms for each transition.

Experimental Results of Embodiments of this Invention:

In these experiments, the first combination mode and the second combination mode comprise an embodiment of this invention with a repeating (not sequential) combination of buck and boost pulses.

Figure 16:
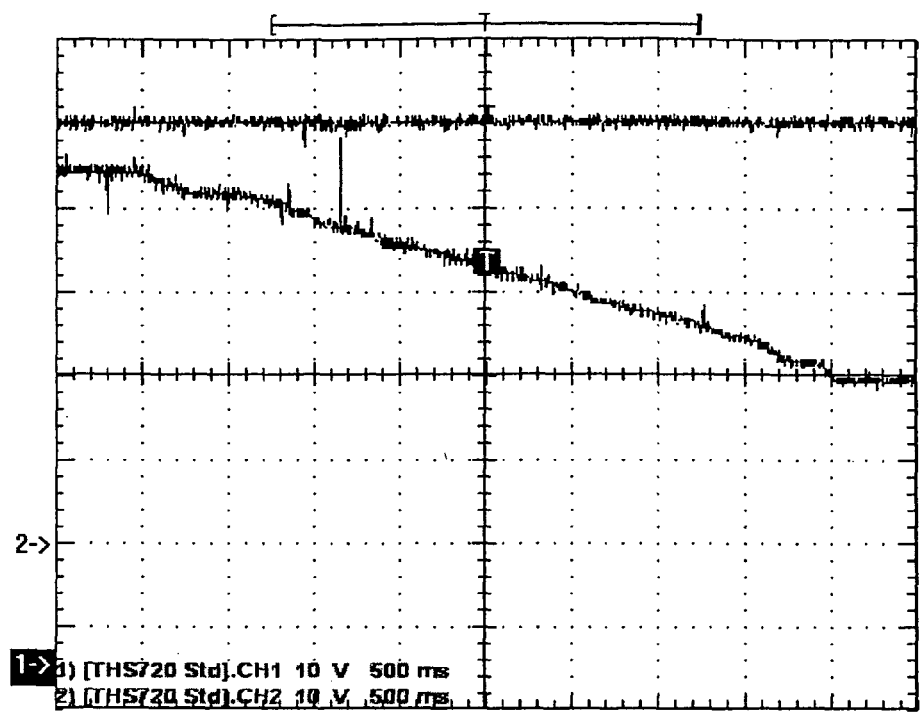
FIG. 16 shows an input voltage and an output voltage for the transition from buck to boost mode according to one embodiment of this invention.

FIG. 16 presents the input voltage and the output voltage for the transition from buck to the first combination mode to the second combination mode to boost mode. The input voltage decreases from 6 V to 3.6 V while the output voltage is tightly regulated at 5 V.

Figure 17A:
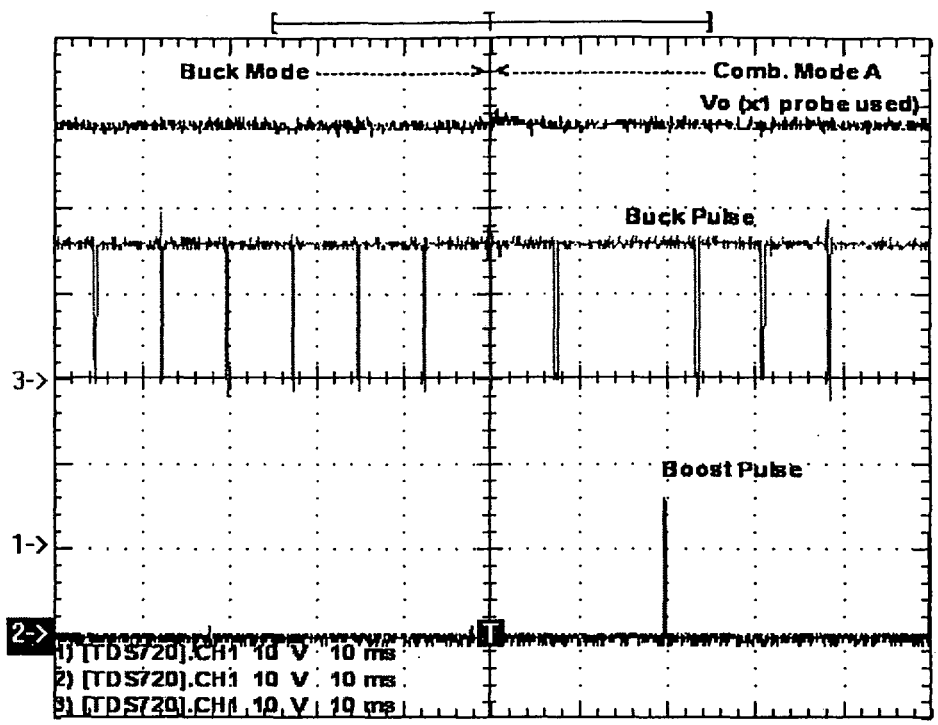
FIGS. 17*a-f* show experimental results for transitions from buck mode to a first combination mode to buck-boost mode to a second combination mode to boost mode according to one embodiment of this invention.
Figure 17B:
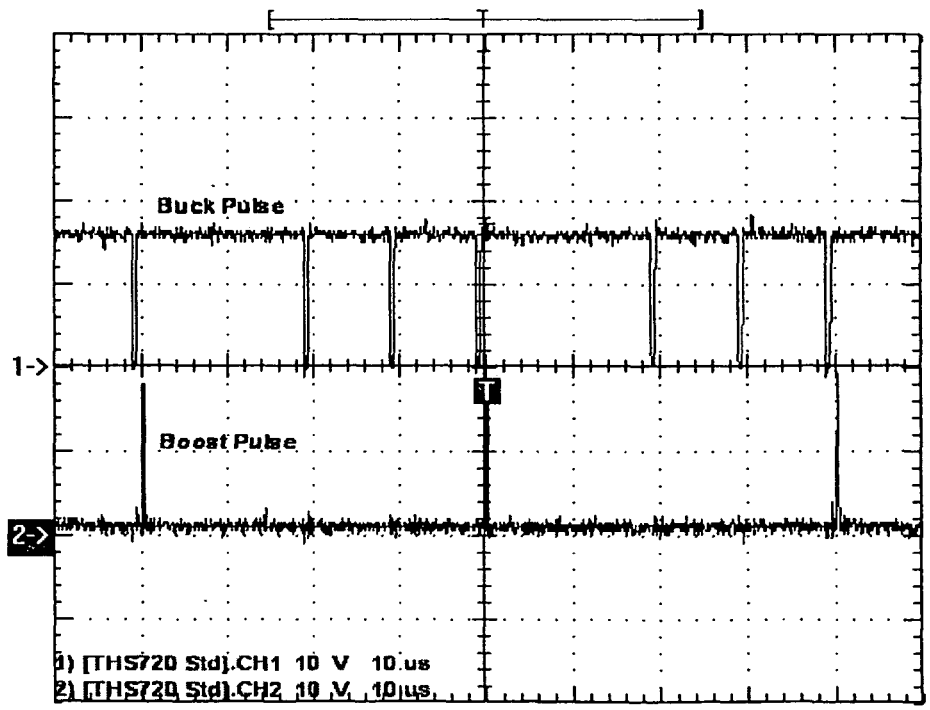
Figure 17C:
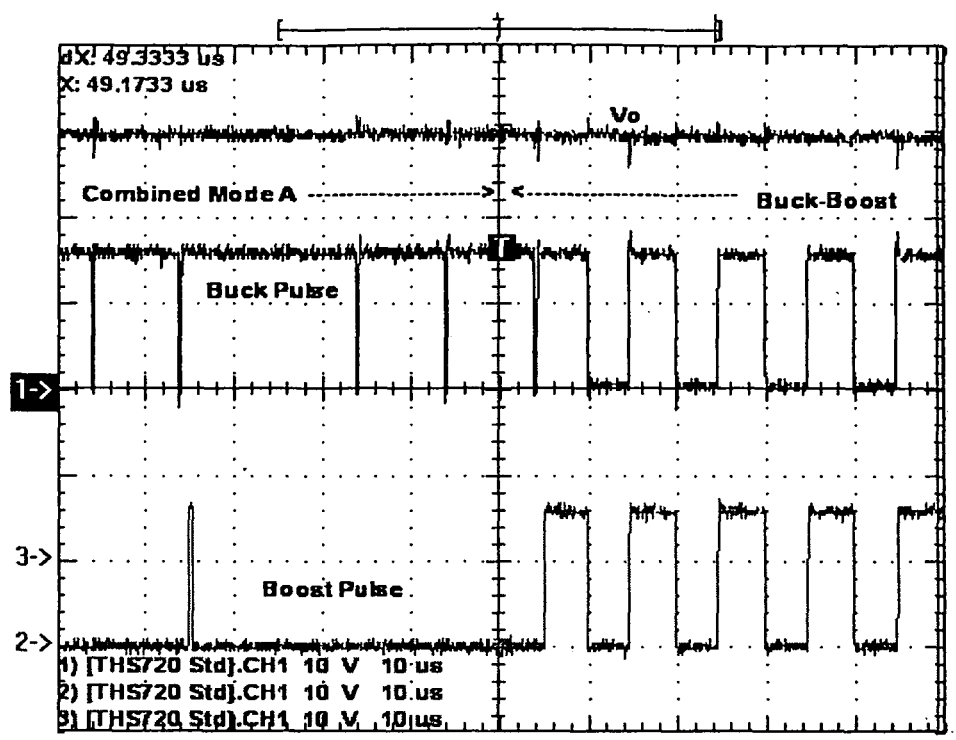
Figure 17D:
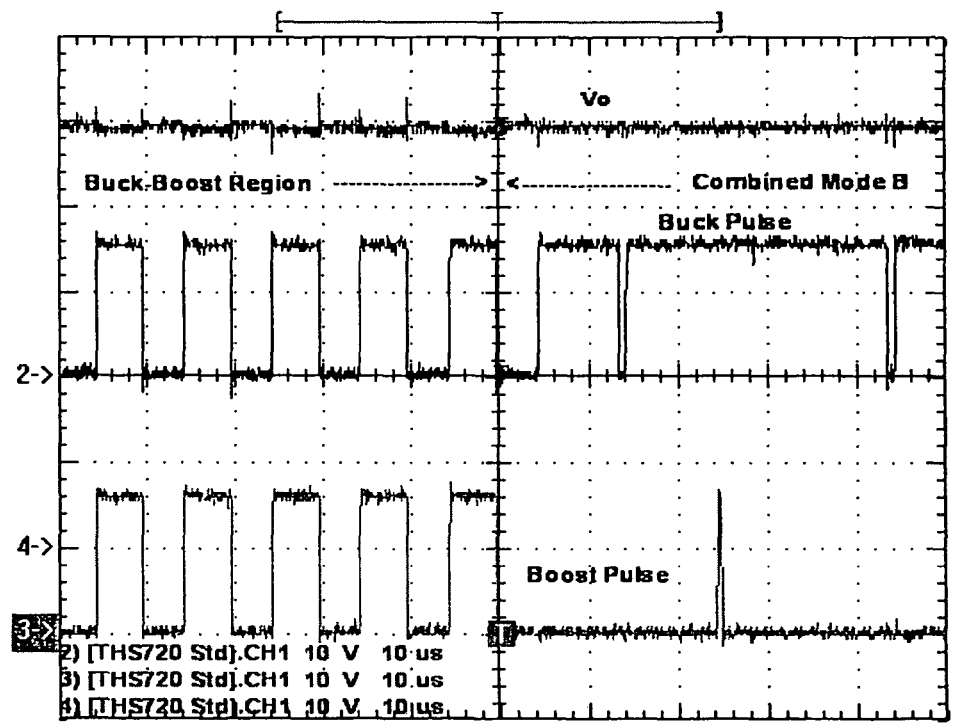
Figure 17E:
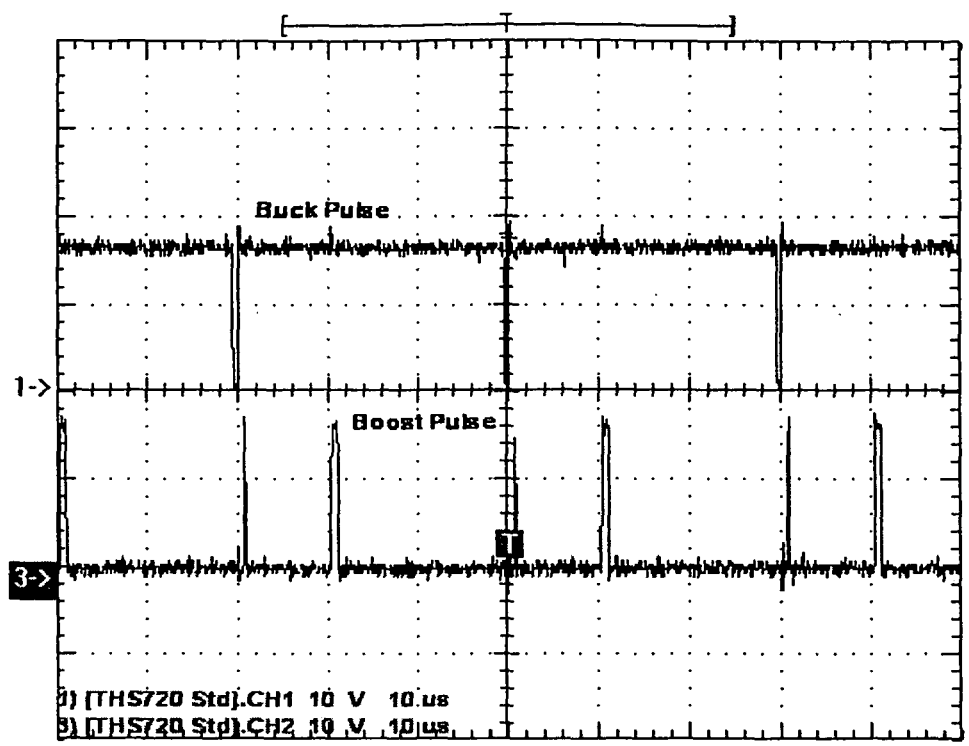
Figure 17F:
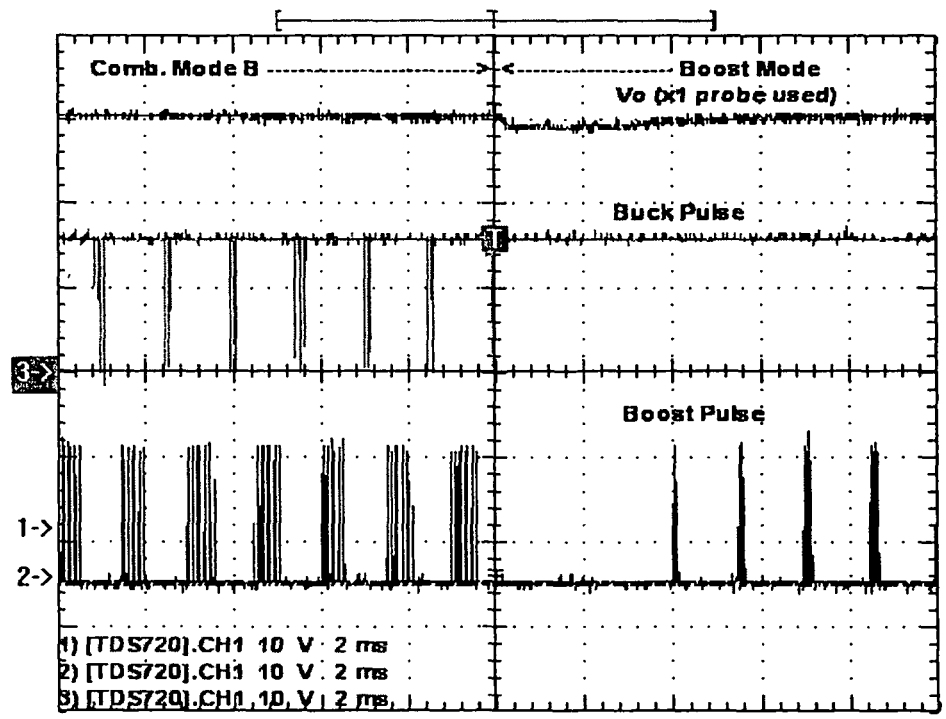

The experimental result for the transition from buck mode to the first combination mode to buck-boost mode to buck-boost mode to the second combination mode to boost mode is shown in detail in FIGS. 17a-f. FIG. 17a shows the output voltage variation as well as buck and boost pulses in transition from the buck mode to the first combination mode. FIG. 17b shows buck and boost pulses in the first combination mode, where three buck pulses are associated with one boost pulse. FIG. 17c shows buck, boost, and buck-boost pulses in the transition from the first combination mode to the buck-boost mode. FIG. 17d shows buck, boost, and buck-boost pulses in the transition from the buck-boost mode to the second combination mode. FIG. 17e shows buck and boost pulses in the second combination mode, before transition to the boost mode. In the second combination mode, each buck pulse is associated with two boost pulses. FIG. 17f shows the output voltage, the buck pulses and the boost pulses in the transition from the second combination mode to the boost mode.

Figure 18:
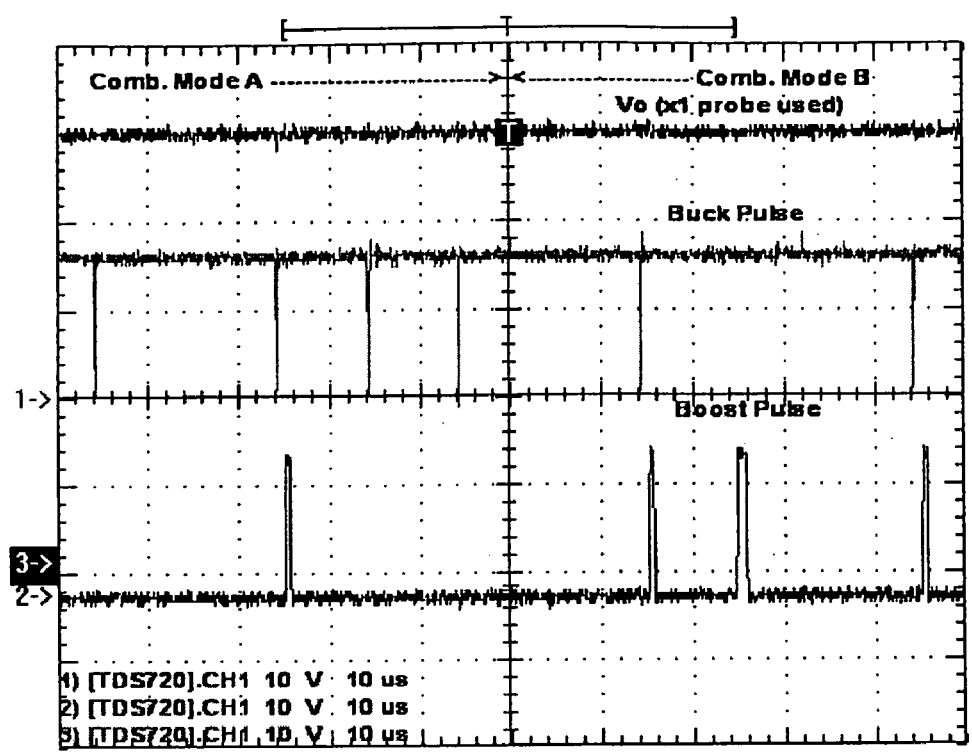
FIG. 18 shows experimental results for a transition from a first combination mode to a second combination mode for one embodiment of this invention.

In order to improve the efficiency of the converter in addition to improving the output voltage transients, dynamic behavior of the system for a direct transition from the first combination mode to the second combination mode is investigated. FIG. 18 shows the experimental results for the output voltage, buck pulses, and boost pulses in a direct transition from the first combination mode to the second combination mode for an embodiment of this invention where the buck-boost mode is omitted.

Table 2 summarizes experimental results of the output voltage ripple during transitions from different modes of operation.

TABLE 2

| Transition | Output voltage ripple (%) |
| --- | --- |
| Direct buck to boost | 12% |
| Buck to buck-boost | 4% |
| Buck-boost to boost | 6% |
| Buck to first combination mode | <3% |
| First combination mode to buck-boost | <2% |
| Buck-boost to second combination mode | <2% |
| Second combination mode to boost | <3% |
| First combination mode to second combination mode | <2% |

The voltage ripple is defined as the peak-peak ripple as a percentage of the output voltage of the converter. Direct transition from buck to boost has a voltage ripple of about 12% (FIG. 13). The addition of the buck-boost mode improves the voltage ripple to about 4% in transition from buck to buck-boost (FIG. 14) and improves the voltage ripple of transition from buck-boost to boost to about 6% (FIG. 15); however, staying in the buck-boost mode for a long time sacrifices the efficiency of the converter. Adding the first combination mode and the second combination mode between buck and boost modes, significantly improves the voltage ripple to less than 2-3% (FIGS. 16-18).

Figure 19A:
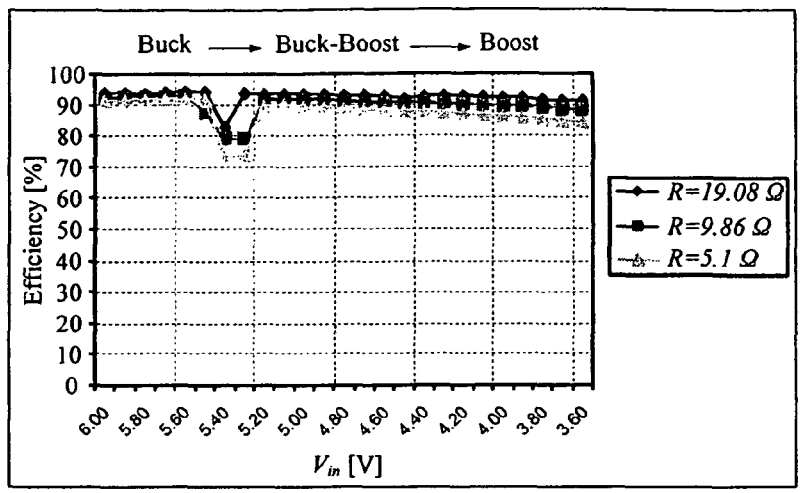
FIGS. 19a-c shows three graphs of efficiency versus input voltage for three methods of operating the converter.
Figure 19B:
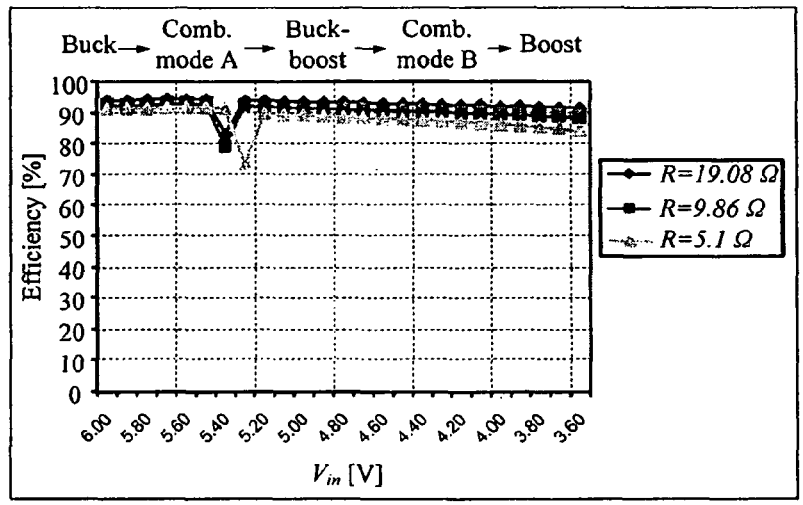
Figure 19C:
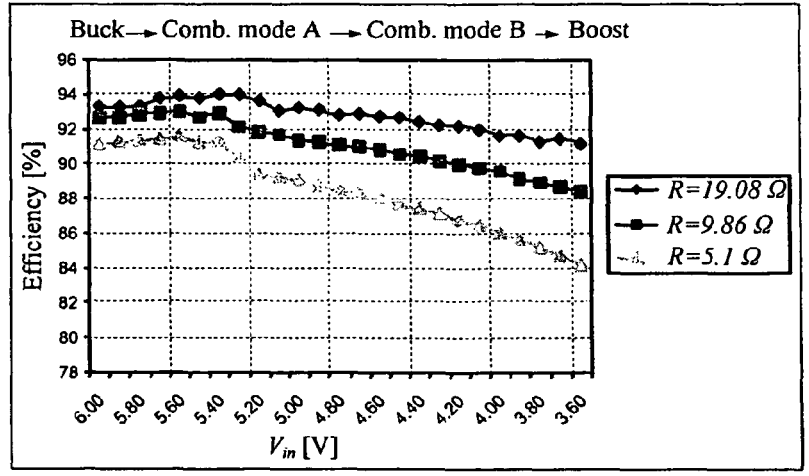

FIGS. 19a-c present efficiency ($P_{out}/P_{in}$) versus the input voltage for three methods of operating the converter for three loads (R) at the output voltage. Efficiency is a function of a load profile. Increasing the load power decreases the efficiency because of increases of ohmic and switching losses. FIG. 19a presents the efficiency of the converter in the transition from buck mode to buck-boost mode to boost mode. Efficiency of the converter, where the input voltage is approximately equal to the output voltage and R=5.1Ω, descends to 73% due to the operation of the converter in buck-boost mode. FIG. 19b presents the efficiency of the converter in the transition from buck mode to first combination mode to buck-boost mode. Similar to the results of FIG. 19a, the efficiency is sacrificed, when input voltage is about 5.4 V. However, eliminating the buck-boost mode, as shown in FIG. 19c, improves the efficiency by about 17% and 20%, respectively, in the case of R=5.1Ω and R=19.08Ω.

Comparing the voltage regulation plots of FIGS. 15-18 and the efficiency plots of FIG. 19, demonstrates that the proposed methodology improves the efficiency and output voltage regulation during transition from one operating mode to another.

Thus, the invention provides a method for controlling a DC/DC converter with a variable power supply. The method introduced improves the dynamic response of the converter during transients by switching between different converter topologies to spread out voltage spikes, which are an inevitable result of transients. The invention also can improve the efficiency of the DC/DC converter by replacing higher loss modes with combination modes.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method of controlling a DC-DC converter to provide a desired output voltage from an input voltage which is different than the desired output voltage comprising:
   providing a switching frequency having a period to the DC-DC converter;
   operating the DC-DC converter in a first converting mode for each period the input voltage is greater than a first predetermined voltage level, wherein the first converting mode comprises a repeating of a first duty cycle pulse;
   operating the DC-DC converter in a second converting mode for each period the input voltage is less than a second predetermined voltage level, wherein the second voltage is less than the first voltage, wherein the second converting mode comprises a repeating of a second duty cycle pulse;
   operating the DC-DC converter in a third converting mode when the input voltage is less than the first predetermined voltage level and greater than the second predetermined voltage level, wherein the third converting mode comprises a plurality of sequential combination configurations of the first duty cycle pulse and the second duty cycle pulse, wherein each subsequent combination configuration of the first duty cycle pulse and the second duty cycle pulse comprises a lesser amount of the first duty cycle pulse and an increased amount of the second duty cycle pulse.

2. The method of controlling the DC-DC converter of claim 1, further comprising switching a switching device, wherein the first duty cycle pulse comprises switching the switching device in a first manner and the second duty cycle pulse comprises switching the switching device in a second manner.

3. The method of controlling the DC-DC converter of claim 1, wherein the DC-DC converter is a positive buck-boost converter, an inverting buck-boost converter, a cascaded buck and boost converter, a Ćuk converter, a SEPIC converter or a fly-back converter.

4. The method of controlling the DC-DC converter of claim 1, wherein an output voltage ripple is less than a predetermined percentage range of the desired output voltage.

5. The method of controlling the DC-DC converter of claim 4, wherein the predetermined percentage range is less than 2 percent of the desired output voltage.

6. The method of controlling the DC-DC converter of claim 1, wherein the first converting mode comprises a buck mode and the first duty cycle pulse comprises a buck duty cycle equal to the desired output voltage divided by the input voltage.

7. The method of controlling the DC-DC converter of claim 6, wherein the second converting mode comprises a boost mode and the second duty cycle pulse comprises a boost duty cycle equal to one minus the input voltage divided by the desired output voltage.

8. The method of controlling the DC-DC converter of claim 7, wherein the combination configuration of the third converting mode comprises the buck duty cycle for $\alpha_1$ periods and the boost duty cycle for $\beta_1$ periods, wherein a ratio of $\alpha_1$ to $\beta_1$ is:

$$\frac{\alpha_1}{\beta_1} = \frac{-(1-d_{boost})^2 \frac{v_{out}}{2L} d_{boost} T - I_{0,boost} + \frac{1}{R} v_{out}}{(1-d_{buck}) \frac{v_{out}}{2L} T + I_{0,buck} - \frac{1}{R} v_{out}}, \text{ and}$$

wherein $d_{boost}$ comprises the boost duty cycle, $v_{out}$ is the desired output voltage, L comprises a magnetizing inductance of an inductor, $I_{0,boost}$ comprises an initial current of the inductor in the boost mode, T comprises the period, R comprises an output resistance, $d_{buck}$ comprises the buck duty cycle and $I_{0,buck}$ comprises an initial current of the inductor in the buck mode.

9. The method of controlling the DC-DC converter of claim 1, wherein the DC-DC converter comprises a first switch coupled between the input voltage and a first terminal of an inductor, a first diode coupled between the first terminal of the input voltage and ground, a second switch coupled between a second terminal of the inductor and ground, and a second diode coupled between the second terminal of the inductor and the output voltage in parallel with a capacitor.

10. The method of controlling the DC-DC converter of claim 9, wherein the first converting mode comprises a buck mode and the first duty cycle pulse comprises a buck duty cycle equal to the desired output voltage divided by the input voltage and during the buck mode the second switch is off and the first switch switches on for the buck duty cycle and off for a remainder of the period.

11. The method of controlling the DC-DC converter of claim 9, wherein the second converting mode comprises a boost mode and the second duty cycle pulse comprises a boost duty cycle equal to one minus the input voltage divided by the desired output voltage and during the boost mode the first switch is on and the second switch switches on for the boost duty cycle and off for a remainder of the period.

12. The method of controlling the DC-DC converter of claim 9, wherein the first switch comprises a first N-type MOSFET, the second switch comprises a second N-type MOSFET, the first diode comprises a first Schottky barrier diode and the second diode comprises a second Schottky barrier diode.

* * * * *